US010007675B2

(12) United States Patent
Marti et al.

(10) Patent No.: US 10,007,675 B2
(45) Date of Patent: Jun. 26, 2018

(54) METHOD OF IMPROVING DATABASE INTEGRITY FOR DRIVER ASSISTANCE APPLICATIONS

(75) Inventors: Lukas Michael Marti, Santa Clara, CA (US); Jorge Sans Sangorrin, Frankfurt am Main (DE)

(73) Assignee: Robert Bosch GmbH, Stuttgart (DE)

( * ) Notice: Subject to any disclaimer, the term of this patent is extended or adjusted under 35 U.S.C. 154(b) by 2362 days.

(21) Appl. No.: 11/831,244

(22) Filed: Jul. 31, 2007

(65) Prior Publication Data
US 2009/0037465 A1    Feb. 5, 2009

(51) Int. Cl.
G06F 17/30    (2006.01)
G08G 1/01     (2006.01)
G07C 5/08     (2006.01)

(52) U.S. Cl.
CPC .. G06F 17/30241 (2013.01); G06F 17/30371 (2013.01); G08G 1/0104 (2013.01); G07C 5/08 (2013.01)

(58) Field of Classification Search
CPC ......... G06F 17/30241; G06F 17/30371; G06F 17/24; G06F 17/30
USPC .................................................. 707/104, 607
See application file for complete search history.

(56) References Cited

U.S. PATENT DOCUMENTS

| | | | |
|---|---|---|---|
| 5,214,757 A * | 5/1993 | Mauney et al. | 715/751 |
| 5,933,100 A | 8/1999 | Golding | |
| 5,948,042 A * | 9/1999 | Heimann et al. | 701/409 |
| 5,951,620 A * | 9/1999 | Ahrens et al. | 701/532 |
| 6,288,676 B1 * | 9/2001 | Maloney | 342/457 |
| 6,356,836 B1 | 3/2002 | Adolph | |
| 6,366,851 B1 * | 4/2002 | Chojnacki et al. | 701/468 |
| 6,434,452 B1 | 8/2002 | Gray | |
| 6,853,913 B2 * | 2/2005 | Cherveny et al. | 701/208 |
| 6,968,250 B2 | 11/2005 | Reade et al. | |

(Continued)

FOREIGN PATENT DOCUMENTS

EP    0921509 A2    6/1999

OTHER PUBLICATIONS

Young, Steven D., On The Development of In-Flight Autonomous Integrity Monitoring of Stored Geo-Spatial Data Using Forward-Looking Remote Sensing Technology; A dissertation presented to the faculty of the Fritz J. and Dolores H. Russ College of Engineering and Technology of Ohio University; Mar. 2005, 182 pages.

*Primary Examiner* — Apu Mofiz
*Assistant Examiner* — Sheryl Holland
(74) *Attorney, Agent, or Firm* — Maginot Moore & Beck LLP

(57) ABSTRACT

A method of maintaining a database for a plurality of vehicles includes obtaining first sensor data from a vehicle sensor and comparing the first sensor data to data in the database. If the first sensor data does not match the database data, it is determined whether data from a single vehicle sensor or from a plurality of vehicle sensors is required to update the database. The database is updated if consistent data from a required number of vehicle sensors is available. A loss of database integrity is identified if data from a plurality of vehicle sensors is required to update the database but is not available. Anomalous driving is identified if data from a plurality of vehicle sensors is required to update the database and is available, and if the first sensor data is not confirmed by data from other vehicle sensors.

4 Claims, 6 Drawing Sheets

(56) References Cited

U.S. PATENT DOCUMENTS

| | | | |
|---|---|---|---|
| 7,047,130 B2 | 5/2006 | Watanabe et al. | |
| 7,092,777 B2 | 8/2006 | Reade et al. | |
| 7,146,271 B2 | 12/2006 | Furukawa | |
| 7,813,822 B1* | 10/2010 | Hoffberg | 700/94 |
| 8,442,791 B2* | 5/2013 | Stahlin | 702/94 |
| 2002/0049538 A1* | 4/2002 | Knapton et al. | 701/216 |
| 2004/0128355 A1* | 7/2004 | Chao et al. | 709/206 |
| 2004/0206096 A1* | 10/2004 | Jayanth | 62/127 |
| 2004/0218785 A1* | 11/2004 | Kim | 382/105 |
| 2004/0230374 A1 | 11/2004 | Tzamaloukas | |
| 2005/0021229 A1* | 1/2005 | Lee et al. | 701/210 |
| 2007/0008179 A1* | 1/2007 | Hedley et al. | 340/928 |
| 2007/0271029 A1* | 11/2007 | Tzamaloukas | 701/200 |

\* cited by examiner

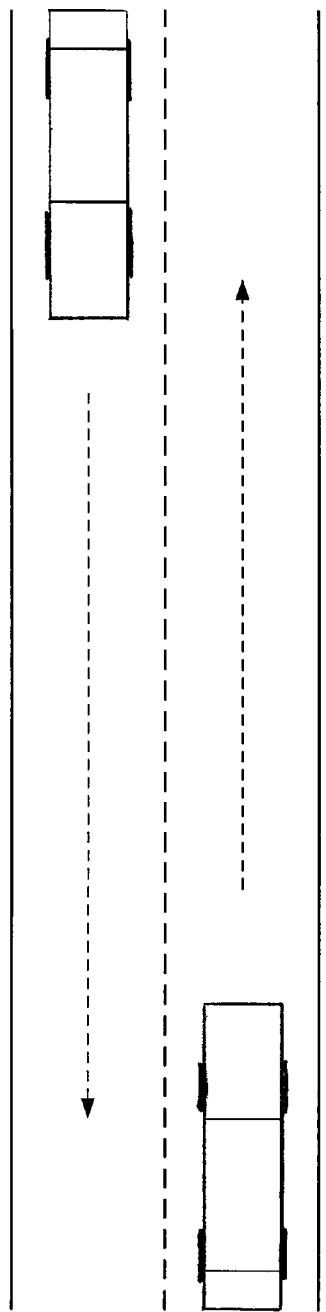
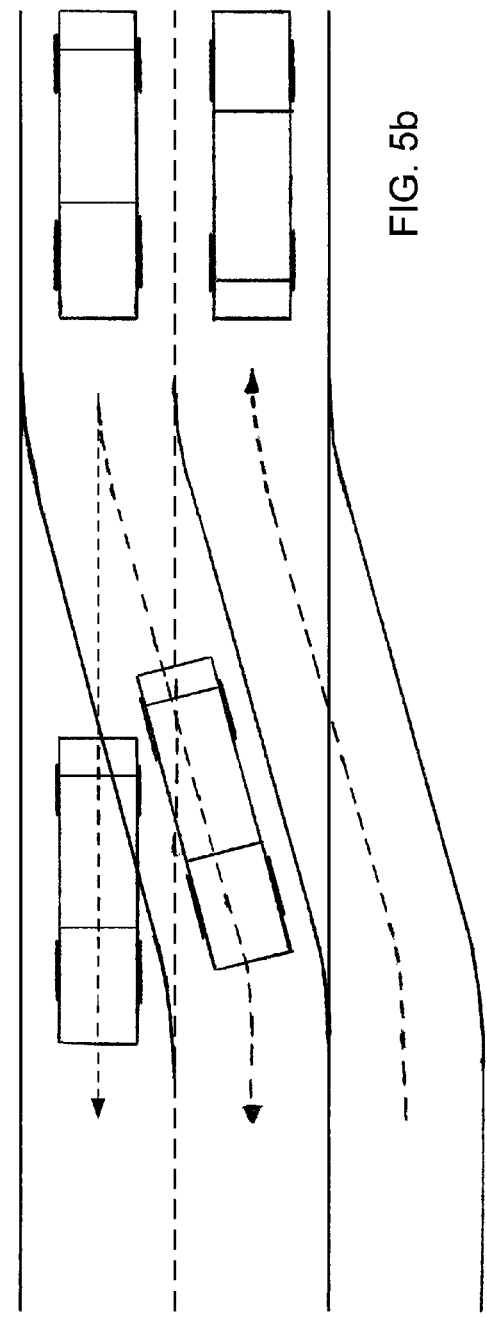

METHOD OF IMPROVING DATABASE INTEGRITY FOR DRIVER ASSISTANCE APPLICATIONS

BACKGROUND OF THE INVENTION

1. Field of the Invention

The present invention relates to a method of maintaining database integrity that is used by multiple vehicles, and, more particularly, to a method of improving the integrity of a database that is used by multiple vehicles.

2. Description of the Related Art

The introduction of global positioning systems (GPS) in vehicles such as trucks and automobiles has enabled a large number of such vehicles to simultaneously use a common database, such as a database for use in navigation. The GPS determines the real-time location of each vehicle, and each vehicle may individually access the navigation database in order to retrieve information to assist the driver of the vehicle in ascertaining a desired route to his destination from the vehicle's real-time location.

A problem with this type of system is that it is difficult to keep the database up to date with the latest road construction projects that directly affect the choice of possible routes, or even the existence of the routes. Map data is generally updated sporadically and thus can be unreliable, i.e. not maintaining integrity. Another problem is that the optimal route may be a function of time-variant variables that cannot be maintained in the database due to the frequent change in these variables. Such time-variant variables may include weather conditions and traffic conditions at specific locations. Thus, a route to a destination may be selected based solely on variables that are relatively time-invariant, such as the locations of roads. However, the optimal route may depend heavily on time-variant variables that are not in the database, such as traffic conditions.

Yet another problem is that, even if it were possible to update the database in real time, not all data that would be collected by vehicles would satisfy integrity. For instance, individual vehicles could have faulty sensors or faulty GPS devices, or could travel "off-road" in areas in which other drivers would not want, or would not be able, to drive. Thus, if the database were updated in real-time with data collected from vehicles, the integrity of the database would suffer due to the bad data that would inevitably be collected for inclusion in the database.

What is needed in the art is a method of maintaining a database for use by multiple vehicles in such a way that integrity of both time-variant and time-invariant data in the database is protected.

SUMMARY OF THE INVENTION

The present invention provides a method for ensuring and maximizing the integrity of a database for driver assistance applications based on treating each vehicle as an individual sensor node. Each sensor node contains a database platform and a sensing platform enabling the establishment of database integrity by correlating the information provided by each platform. If sufficient supporting evidence can be gathered from the sensor nodes, the database is updated and its integrity is thus improved. If sufficient supporting evidence cannot be obtained from a single sensor node, inputs from multiple sensor nodes may provide a sufficient level of information with which to update the database. A loss of database integrity can be detected by comparing the automotive onboard sensing platform real world scenario to the database scenario. Each individual sensor node is able to validate/update only a subset, i.e., a local database, of a global database. The combination of the local database subsets allows maintaining and updating of the global database.

In one embodiment, collected data is compared to a database and, if the data is not matched, it is determined whether it is possible to validate the integrity of the database based upon whether data from multiple sensor nodes are available or whether data from only a single sensor node is available. Based upon the availability of a sufficient number of nodes, and based upon the data provided thereby, it is then determined whether the integrity of the database is validated; whether a loss of database integrity is identified; or whether anomalous driving has occurred.

In one embodiment, the invention comprises a method of maintaining a database for a plurality of vehicles, including obtaining first sensor data from a vehicle sensor and comparing the first sensor data to data in the vehicle database. If the first sensor data does not match the database data, it is determined whether data from a single vehicle sensor or from a plurality of vehicle sensors is required to update the database. The database is updated if consistent data from a required number of vehicle sensors is available. A loss of database integrity is identified if data from a plurality of vehicle sensors is required to update the database but is not available. Anomalous driving is identified if data from a plurality of vehicle sensors is required to update the database and is available, and the first sensor data is not confirmed by data from other vehicle sensors.

The invention comprises, in another form thereof, a method of maintaining a database for a plurality of vehicles, including obtaining first sensor data from a vehicle sensor, and comparing the first sensor data to data in the database. If the first sensor data does not match the database data, it is determined whether data from a single vehicle sensor or from a plurality of vehicle sensors is required to update the database. The database is updated if data from a required number of vehicle sensors is available. A loss of database integrity is identified if data from the required number of vehicle sensors is unavailable.

The invention comprises, in another form thereof, a method of maintaining a database for a plurality of vehicles, including obtaining first sensor data from a vehicle sensor, and comparing the first sensor data to data in the database. If the first sensor data does not match the database data, anomalous driving is identified if data from a plurality of vehicle sensors is required to update the database and is available, and the first sensor data is not confirmed by data from other vehicle sensors.

An advantage of the present invention is that the integrity of the database is improved.

Another advantage is that the global database may be formed as a compilation of individual databases.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 5a is a diagram of an expected driving pattern from a database suitable for use with the method of the present invention.

FIG. 5b is a real time driving pattern for use with the method of the present invention.

Figure 1:
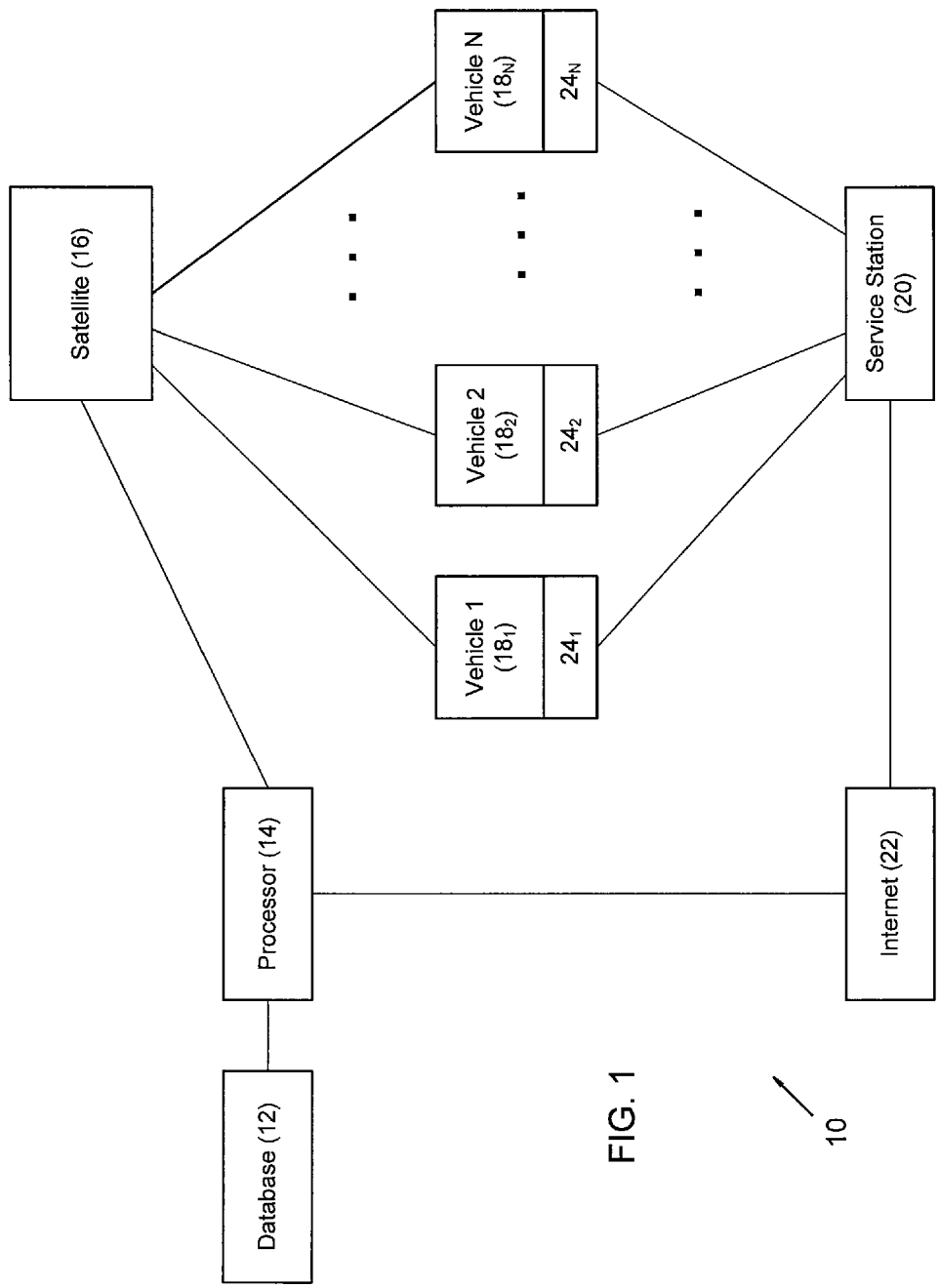
FIG. 1 is a block diagram of one embodiment of a database maintenance arrangement that is suitable for use in the method of the present invention for maintaining a database for use by multiple vehicles.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Referring now to the drawings and particularly to FIG. 1, there is shown one embodiment of a database maintenance arrangement 10 that is suitable for use in the method of the present invention for maintaining a database for use by multiple vehicles. Arrangement 10 includes a database 12, processor 14, satellite 16, vehicles $18_1, 18_2, \ldots, 18_N$, service station 20 and Internet 22.

Vehicles $18_1, 18_2, \ldots, 18_N$ include respective sensor banks $24_1, 24_2, \ldots, 24_N$ which may each include one or more sensors for detecting parameters of the vehicle's environment, such as the vehicle's global position (GPS), the vehicle's speed, the ambient temperature, moisture conditions, the state of the vehicle's traction on the road, etc. All such sensed data measurements may be updated in real-time with any desired frequency (i.e., any desired time periods between readings).

The data readings from the sensors of vehicles $18_1, 18_2, \ldots, 18_N$ may be transmitted to processor 14, which may be disposed remotely from vehicles 18, perhaps in a centralized location. In one embodiment, the data from vehicles 18 is transmitted to processor 14 via one or more satellites 16. For instance, each of vehicles 18 may transmit radio frequency signals to satellite 16 wherein the signals carry the sensor data. Satellite 16 may, in turn, transmit radio frequency signals to processor 14 wherein the signals carry all of the sensor data received by satellite 16. Satellite 16 may be a GPS satellite. In an alternative embodiment, vehicles 18 may transmit radio frequency signals directly to processor 14, wherein the signals carry the data captured by the vehicle sensors.

In yet another embodiment, the data from vehicles 18 is transmitted to processor 14 via service station 20 and Internet 22. Service station 20 may be in the form of an automobile dealership location where sensor data may be received from the vehicle sensor banks 24 via an infrared link or via a hard wired cable, for example. After the sensor data from a vehicle 18 has been uploaded at service station 20, the data may be downloaded to processor 14 via the Internet 22 (i.e., the world wide web).

Processor 14 is electrically connected to database 12 such that processor 14 may update database 12 based on the data received from vehicles 18. That is, processor 14 may add all or a subset of the data received from vehicles 18 to database 12. In doing so, processor 14 may overwrite or delete some or all of the existing data in database 12. In one embodiment, database 12 and processor 14 are located at the same centralized location.

Processor 14 may also retrieve data from database 12 for use by one or more of vehicles 18. In one embodiment, the data is transmitted from processor 14 to vehicles 18 via radio frequency signals that may be relayed by satellite 16. Alternatively, or in addition, data from database 12 may be transmitted to service station 20 via processor 14 and Internet 22. The data may then be downloaded to memory devices in vehicles 18 while vehicles 18 are at service station 20.

The data used by vehicles 18 may be related to road conditions, traffic conditions, weather conditions, etc., and may be updated in database 12 and distributed to vehicles 18 in real-time, or nearly real-time. The data received by vehicles 18 may be used by navigation systems within vehicles 18, for example, to help the drivers of vehicles 18 select optimal routes to their desired destinations.

The usefulness of database 12 to the drivers of vehicles 18 is related to the integrity of the data stored therein. However, data provided to database 12 by vehicles 18 may be inaccurate due to faulty sensors on vehicles 18, or may be due to vehicles temporarily driving off-road or through car washes or tunnels from where the vehicle sensors may not provide data readings that are indicative of actual environmental conditions. The data provided by vehicles 18 may also simply be out of date. Because not all the data provided by vehicles 18 is accurate and useful for the drivers of other vehicles, the method of the present invention provides measures for improving the integrity of the data stored in database 12.

Thus, there is a need for improved integrity in a database for current and future driver assistance applications that host relevant features and environmental parameters. The greater the number of features and parameters that are included in a database platform, the higher the probability of the data being out of date or having a disparity between real world environmental conditions and environmental scenarios derived from a database. Improving database integrity is advantageous for achieving reliable implementation of future automotive applications. The present invention provides an approach to improve and enhance database integrity that may be based on treating each vehicle as an individual sensor node. Each sensor node may contain a database platform and a sensing platform that enable the improvement of database integrity via correlation of the information provided by each platform. If enough supporting evidence is gathered that the data in the database is in any way inaccurate, the database may be updated and its integrity may be thus improved. If a single sensor node cannot provide enough supporting evidence to warrant an update of the database, data inputs from multiple sensor nodes may be analyzed in order to provide sufficient information such that the database may be updated.

One trend in automotive electronic applications is the deployment of an increasing number of driver assistance systems. Databases are employed in current and future driver assistance applications that host relevant features. Hence, the application integrity of the system is determined not only by the integrity of the onboard sensing operation, i.e., the sensing integrity, but also by the integrity of the underlying database. As used herein, "database integrity" may be regarded as the degree of correlation between the real world and the world as represented by the database; "database", as used herein, may be regarded as an organized collection of automotive-relevant features representing the environment or surroundings of the vehicle; and "features" as used herein may be regarded as variables or parameters that may be measured or sensed and that are indicative of the environment or surroundings of the vehicle.

As the amount, refinement, and resolution of database-defined features increases in the future, the probability grows exponentially of having a discrepancy between the values of the features as measured and stored in the database and the actual, real world values of the features. A driver assistance application relying on an erroneous set of database provided features or data may therefore suffer a loss of application integrity. As used herein, a "loss of application integrity" may be defined as undetected false operation of the system, or as an undetected inaccuracy of the data stored in the database. Thus, as long as the system is capable of detecting unsafe application operation, or is capable of detecting inaccuracies in the data stored in the database, it is possible to improve the application integrity of the system.

The present invention addresses the enhancement and improvement of database integrity, as well as the detection of a loss of database integrity in order to improve performance of current and future applications that rely on databases. The present invention may leverage the availability of a sensing platform. More particularly, whenever a sensing platform is available, the present invention may use the sensing platform to validate database information, i.e., to establish database integrity.

Figure 2:
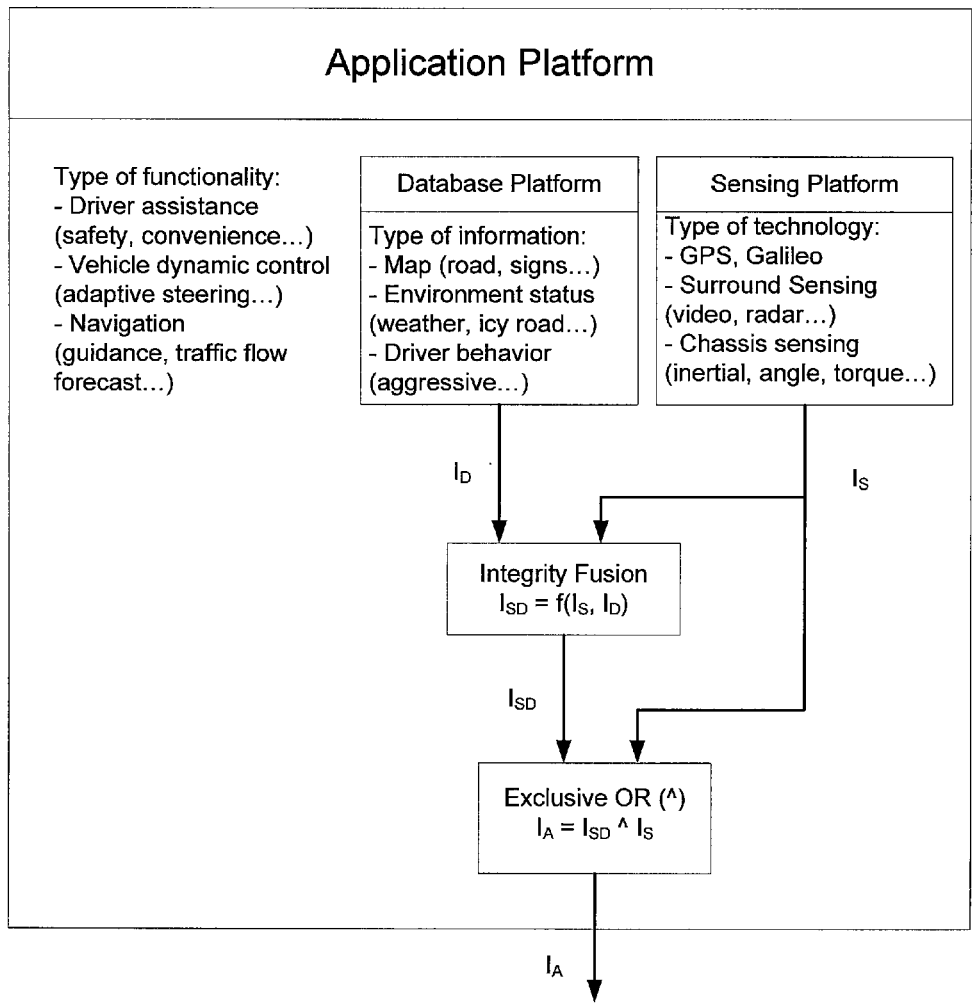
FIG. 2 is a flow chart illustrating factors in the integrity of an application in one embodiment of a method of the present invention for maintaining a database for use by multiple vehicles.

In order to define the focus and environment of the present invention more precisely, a possible model of the relationships between the different levels of integrity within the application domain is presented in FIG. 2. This model distinguishes between four types of integrity: Application Integrity ($I_A$), Sensing Integrity ($I_S$), Database Integrity ($I_D$) and Sensing-Database Integrity ($I_{SD}$). Thus, the present invention may address the improvement and enhancement of $I_D$. FIG. 2 also illustrates the point that a loss of Database Integrity $I_D$ does not result in a loss of Application Integrity $I_A$ so long as Sensing Integrity $I_S$ satisfies Application Integrity $I_A$.

Detecting the loss of database integrity. Database integrity $I_D$ may provide a bound or limit on the confidence that the information provided by the database is within its specification. More loosely expressed, database integrity $I_D$ may indicate the degree of correlation between the values or information in the database and the real world values or information. The database confidence bound, which may be interpreted as a quality measure (i.e., the database integrity), may be used to decide whether a given database may be used for a specific application or needs to be disregarded. The decision threshold value of the confidence bound may be driven through the application requirement for satisfactory operation (i.e., minimum integrity). For example, providing navigation information, such as the location of a street, does not require a high level of database integrity because no safety related information is involved in this application. On the other hand, safety related applications demand a high degree of database integrity because otherwise occupants may be placed at risk.

The ability to detect a loss of database integrity will be a requirement for safety related applications relying on a database because it facilitates the enhancement or improvement of application integrity. Hence, an application alert (i.e., an alert signal being sent to the driver) may be initiated under either of the following two conditions: a) the application is operating properly and a critical situation is imminent; or b) the application is operating improperly and no critical situation is imminent, i.e., a false alert is sent to the driver. Conversely, an application alert may not be sent to the driver under either of the following two conditions: a) the application is operating properly and no critical situation is imminent; or b) the application is operating improperly and a critical situation is imminent, i.e., the system missed detection of the imminent critical situation. Under condition b) in either scenario (i.e., improper application operation, regardless of whether an application alert is or is not sent) a false alert or missed detection is present, given the database being relevant to the application. This may yield a loss of application integrity.

The present invention provides a method of detecting a loss of database integrity by comparing the data produced by the automotive onboard sensing platform (reflecting the real world scenario) to the data retrieved from the database. An assumption may be made that the onboard sensors are capable of producing data that is indicative of the real world scenario with a sufficient level integrity.

Improving or enhancing database integrity. Erroneous database information may stem from the high rate of change of the real world features captured and stored in the database. That is, the values of the parameters may change in the real world faster than the database can be updated. Another cause of erroneous database information may be that the real world parameter values are improperly measured. For example, a faulty sensor will likely continually produce inaccurate measurements of real world parameters. The probability of having erroneous database information grows vastly and/or exponentially, which jeopardizes database integrity, as the amount, refinement, and resolution of database defined features increase, as they undoubtedly will in the future. Despite the challenges presented by growing databases, limited resources for database maintenance are available.

Figure 3:
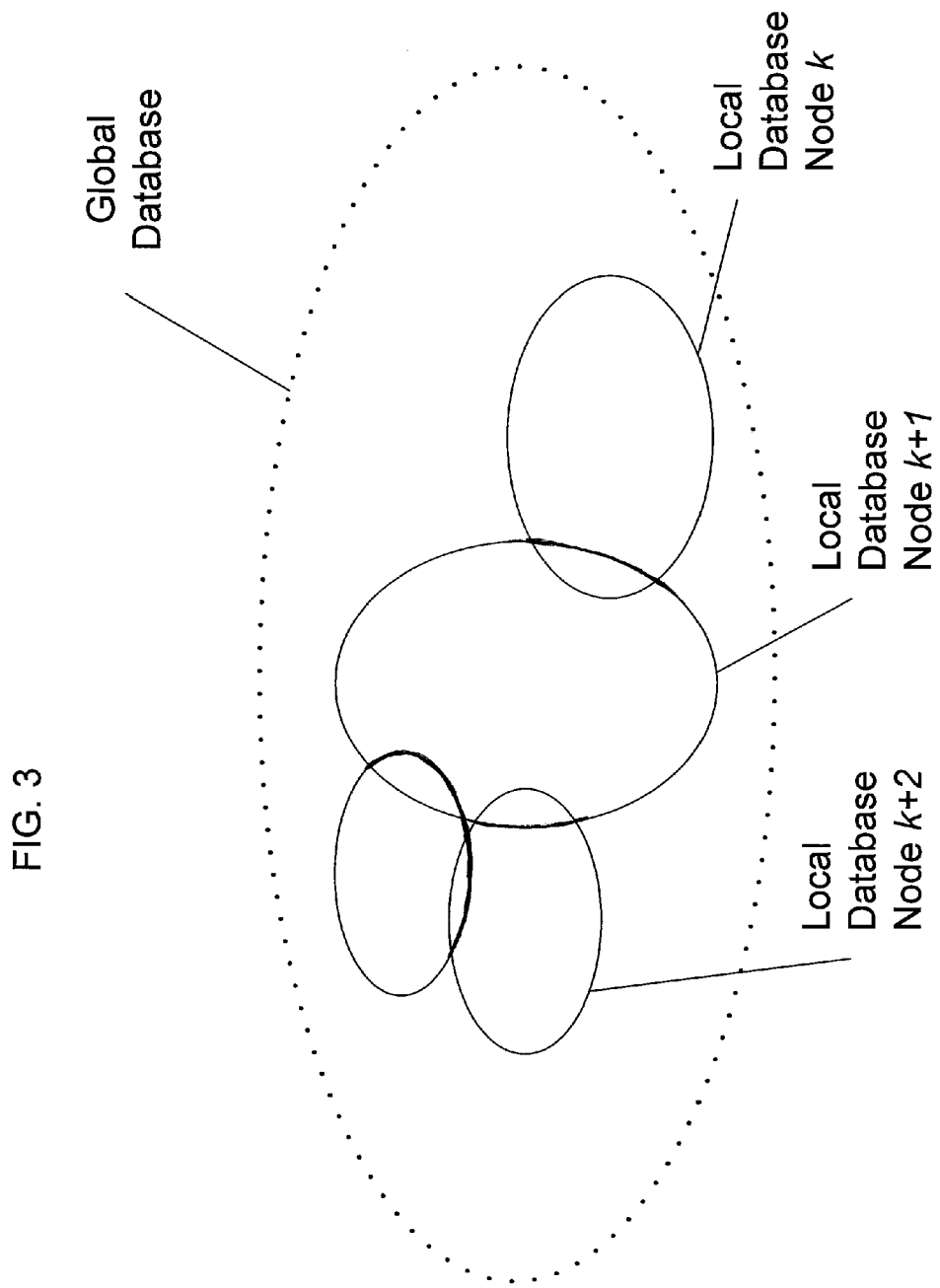
FIG. 3 is a diagram of a global database that is suitable for use in the method of the present invention for maintaining a database for use by multiple vehicles.

An approach in one embodiment of the present invention for enhancing and improving database integrity is to treat each single user as an individual sensor node. Each sensor node may be able to validate and/or update only a subset, i.e., a local database, of the vast database information (global database). This concept is illustrated in FIG. 3 wherein the global database is formed of a conjunction of multiple local database nodes k, k+1, k+2, etc. Due to the large size of the global database, the conjunction of the local database subsets may allow maintaining and/or updating the global database. Further, each sensor node, i.e., each car 18, may be equipped with an on-board sensing platform, which enables a sensor-based representation of the actual world scenario to be derived. Correlating the sensing platform derived representation of the actual world scenario to the database information may enable the database information to be validated. Such validation may be performed under the assumption that the integrity of the sensing platform is sufficient. Correlating the sensing platform derived representation of the actual world scenario to the database information may also enable the specific database feature or parameter values to be updated in the event that divergence (i.e., poor correlation) is detected. This process is illustrated in FIG. 4.

The application platform, as illustrated in FIG. 2, may be implemented in each sensor node. Thus, each sensor node may contain a database platform as well as a sensing platform.

In one embodiment of the present invention, in order to update the global database with a local database subset, either the information may be transmitted to a central server such as processor 14 via a telematic data link (e.g., via satellite 16), or the information may be read out of the onboard system during a regular garage maintenance task (e.g., at service station 20) and then be uploaded to the central server, such as via Internet 22.

Figure 4:
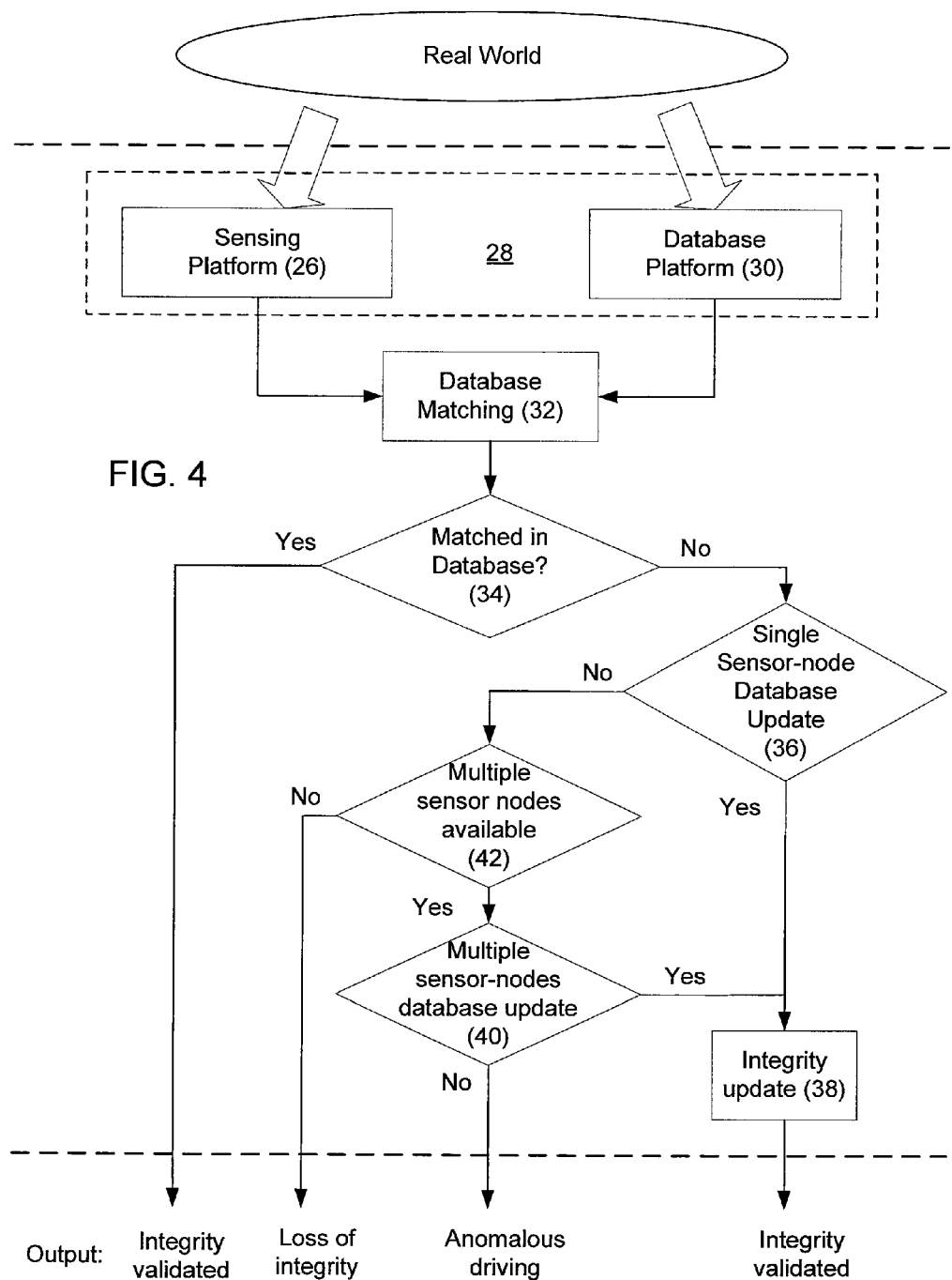
FIG. 4 is a flow chart of one embodiment of a method of the present invention for maintaining a database for use by multiple vehicles.

The embodiment of the method of the present invention depicted in FIG. 4 begins with determining the correlation between the information provided by the sensing platform 26 of the sensor node equipment 28 and the information stored within a general-purpose database platform 30, as shown at 32. Next, if the information provided by sensing platform 26 is matched in database 30, as determined at 34, then integrity is validated. However, if no information matching between these two types of data is found, then it is checked at 36 whether the database can be updated. To that end, there are two options. The first option, shown at 38, is to use data from the on-board sensing platform 26 that is integrated in the sensor-node (i.e., the vehicle containing the on-board sensing platform 26) to update the database (single-node database update). The second option, shown at 40, is to use information and data provided by other sensor nodes in addition to, or instead of, data from the on-board sensing platform 26 to update the database (multiple-node database update). Finally, when the database can be updated, integrity is validated. In contrast, anomalous driving is detected when no update is possible, as determined at 40, and multiple sensor nodes were available, as determined at 42. Loss of integrity is declared if only a single sensor node is available, as determined at 42, and no update is possible, as determined at 36.

The information provided by onboard sensing platform 26 at a monitored level of integrity will be correlated to the database information in order to detect erroneous database information as well as to update the database integrity confidence bound. This indicator depends on the sensing equipment in the vehicle. In one embodiment of the present invention, the integrity of any feature in the database may be validated based upon data collected by the sensing platform in the real world scenario. Some sensor nodes may support more and/or different features that are depicted in the database than other sensor nodes, as discussed in the case study below. That is, different vehicles may have different sets of sensors that collect different types of data, but any data collected by any of the vehicles may be contributed to the database.

Case Study. The aforementioned aspects of the present invention are illustrated by the following case study which also illustrates that database integrity reaches a variety of facets. In one example, a vehicle 18 travels on a street that is not included in the database, perhaps because the database is simply out of date. A single sensor node may be able to detect the loss of database integrity (i.e., the street being missing in the database), and may also be able to update the database (under sufficient sensing integrity). Consequently, a single sensor node may improve database integrity of this specific feature (street locations).

The following example addresses the scenario of ongoing roadwork in which the lanes are redirected as illustrated in FIGS. 5a and 5b, wherein this information regarding the redirection of lanes is not currently included in the database. Based on the information currently in the database, the expected driving pattern is as illustrated in FIG. 5a. However, due to the redirection of the lanes that is initiated by the roadwork, the vehicle follows a driving pattern as presented in FIG. 5b. Thus, a determination of the correlation between the road data in the database and the driving pattern data presently collected by the sensing platform of the sensor node would reveal a mismatch therebetween.

The situation described immediately above may result in a declaration of a loss of database integrity because of the sensing of a non-expected driving pattern. In order to provide increased database integrity for the applications, the database may be updated. Referring to the diagram flow in FIG. 4, it may be first analyzed, at 36, whether the information provided by the on-board sensing platform of a single sensor node may be used to update the database. However, if the single sensor node information is not sufficient to update the database (e.g., because the sensing equipment is inadequate), then the information provided by multiple sensor nodes that are expected to follow the same pattern (e.g., route of travel) may be analyzed, as at 42, to determine whether database integrity can be validated. Thus, if no update is possible, then loss of database integrity may be declared and the application could be alerted. In contrast, database integrity may be validated if the database can be updated.

Anomalous driving may be detected if supporting evidence is found through multiple sensor nodes, as at 42. Loss of integrity may be declared if anomalous driving behavior is executed (e.g., falling asleep and swerving over the lane divider) and no supporting evidence can be gathered.

The greater the number of features that are included in a database platform, the higher the probability of the database platform being out of date or of there being a disparity between data presently collected from the real world and data retrieved from the database. Improved database integrity may facilitate the reliable implementation of future automotive applications.

The present invention provides an approach to improving database integrity based on treating each vehicle as an individual sensor node. Each sensor node may contain a database platform and a sensing platform enabling database integrity to be improved by means of correlation of the information provided by each platform. If enough supporting evidence can be gathered, the database may be updated and its integrity may be consequently improved. If a single sensor node cannot provide enough information for the database to be updated, then it is possible that data from multiple sensor nodes may provide sufficient information.

An exhaustive list of features, variables and parameters that may be included in a database whose integrity may be improved by the present invention has not been provided herein. However, it is to be understood that any type of feature, variable and parameter may fall within the scope of the present invention. Further, it is envisioned that both relatively time-invariant features (e.g., street locations) and time-variant features (e.g., weather conditions) may fall within the scope of the present invention.

Figure 6:
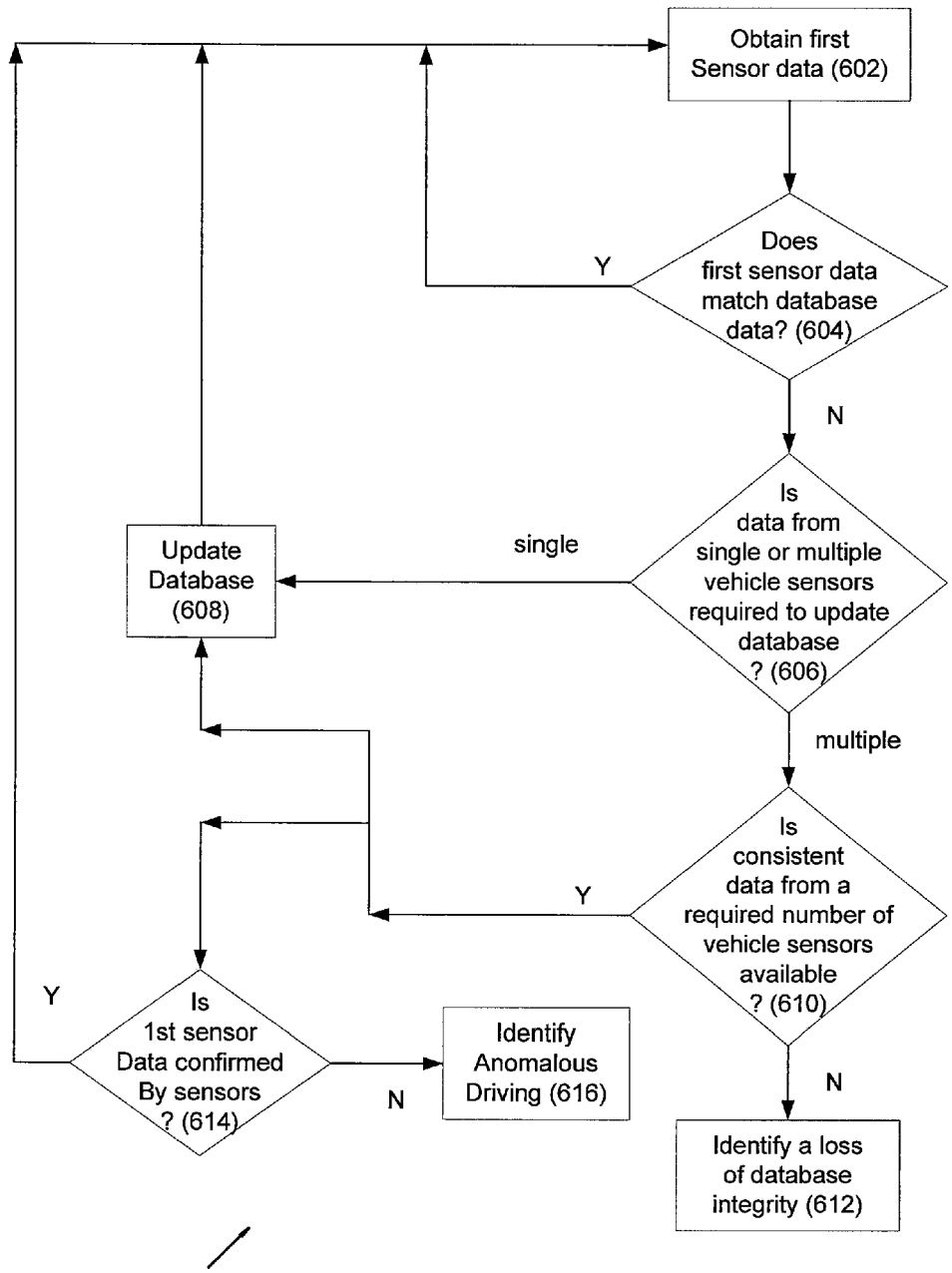
FIG. 6 is a flow chart of one embodiment of a method of the present invention for maintaining a database for use by multiple vehicles.

FIG. 6 illustrates another embodiment of a method 600 of the present invention for maintaining a database for use by multiple vehicles. In a first step 602, first sensor data is obtained. For example, a sensor in a sensor bank 24 of a vehicle 18 may collect data relative to a certain variable, such as street location. In a next step 604, it is determined whether the first sensor data matches (i.e., is correlated with) data retrieved from the global database. More particularly, data in the database may indicate that a road is straight, as illustrated in FIG. 5a, while real world data collected by the vehicle may indicate that the road curves, possibly due to road construction, as illustrated in FIG. 5b. If in fact no such construction exists, and the real-time data matches the data in the database, then operation returns to step 602 for further collection of real-time data. However, if the scenario illustrated in FIGS. 5a and 5b occurs, thereby causing a mismatch between the real-time data and the data stored in the database, then operation continues to step 606, where it is determined whether data from single or multiple vehicle sensors is required to update the database. If data from a single vehicle sensor is sufficient to update the database, then the database may in fact be updated with the newly acquired sensor data, as indicated at 608. Operation then may return to 602 for further collection of data. If, however, at 606 it is determined that data from multiple vehicle sensors is required to update the database, then at step 610 it is determined whether consistent data from a required number of vehicle sensors is available. If consistent data from a required number of vehicle sensors is not available, e.g., if consistent data from two vehicles is required to update the database and only data from the one vehicle that does not match the database is available, then operation continues to step 612, whereat a loss of database integrity is identified. If, in step 610, it is determined that consistent data from a required number of vehicle sensors is available, then that consistent data is used to update the database, as indicated at 608. Further, at step 614 it is determined whether the data from the first sensor is confirmed by the other sensors. If so, then no anomalous driving is detected, and operation returns to step 602 where collection of first sensor data continues. However, if the data from the first sensor is not confirmed by the other sensors, then, in a final step 616, anomalous driving is identified. That is, it is determined that the driver is not properly staying within his lane, or perhaps has left the road entirely.

While this invention has been described as having an exemplary design, the present invention may be further modified within the spirit and scope of this disclosure. This application is therefore intended to cover any variations, uses, or adaptations of the invention using its general principles.

What is claimed is:

1. A method of maintaining a database for a plurality of vehicles, said method comprising:

receiving first sensor data from a first vehicle connected to the database, the first sensor data indicating one or more parameters pertaining to an environment surrounding the first vehicle;

comparing the first sensor data to stored data in the database to identify whether the first sensor data matches the stored data using a processor connected to the database, when the first sensor data does not match the stored data, determining whether the first sensor data is sufficient to warrant an update of the database;

when the first sensor data does not match the stored data and the first sensor data is determined to be sufficient to warrant an update of database, updating the stored data in the database based on the first sensor data;

when the first sensor data does not match the stored data and the first sensor data is determined to not be sufficient to warrant an update of database, determining whether other sensor data from other vehicles is available to confirm the first sensor data;

when the other sensor data is not available to confirm the first sensor data, declaring a loss of database integrity of the database; and when the other sensor data is available and the other sensor data confirms the first sensor data, updating the stored data in the database based on the first sensor data and the other sensor data.

2. The method of claim 1, further comprising:

when the other sensor data is available and the other sensor data does not confirm the first sensor data, identifying the first sensor data as corresponding to anomalous driving.

3. The method of claim 2, wherein, when anomalous driving is identified, the first sensor data is excluded from updates of the database.

4. The method of claim 1, wherein the processor is remote from the first vehicle, and the first sensor data is transmitted from the first vehicle to the processor.

* * * * *